United States Patent
Holtzman et al.

(10) Patent No.: US 6,875,933 B2
(45) Date of Patent: Apr. 5, 2005

(54) METHODS AND APPARATUS FOR CONFIGURING A WRITING SURFACE

(75) Inventors: Rafi Holtzman, San Mateo, CA (US); Jacob Harel, San Francisco, CA (US)

(73) Assignee: Luidia Inc., San Carlos, CA (US)

( * ) Notice: Subject to any disclaimer, the term of this patent is extended or adjusted under 35 U.S.C. 154(b) by 305 days.

(21) Appl. No.: 10/142,495

(22) Filed: May 10, 2002

(65) Prior Publication Data
US 2003/0209369 A1 Nov. 13, 2003

(51) Int. Cl.⁷ .............................................. G08C 21/00
(52) U.S. Cl. ............................. 178/18.01; 178/18.02; 178/18.03
(58) Field of Search ...................... 178/18.01–18.07, 178/19.01–19.03; 345/173–180

(56) References Cited

U.S. PATENT DOCUMENTS

| | | |
|---|---|---|
| 3,613,066 A | 10/1971 | Cooreman |
| 3,706,850 A | 12/1972 | Fisher et al. |
| 3,838,212 A | 9/1974 | Whetstone et al. |
| 4,012,588 A | 3/1977 | Davis et al. |
| 4,506,354 A | 3/1985 | Hansen |
| 4,558,313 A | 12/1985 | Garwin et al. |
| 4,670,751 A | 6/1987 | Enokido et al. |
| 4,711,977 A | 12/1987 | Miyamori et al. |
| 4,758,691 A | 7/1988 | DeBruyne |
| 4,777,329 A | 10/1988 | Mallicoat |
| 4,814,552 A | 3/1989 | Stefik et al. |
| 5,023,408 A | 6/1991 | Murakami et al. |
| 5,134,388 A | 7/1992 | Murakami et al. |
| 5,239,139 A | 8/1993 | Zuta |
| 5,248,856 A | 9/1993 | Mallicoat |
| 5,325,110 A | 6/1994 | Tang et al. |
| 5,434,370 A | 7/1995 | Wilson et al. |
| 5,475,401 A | 12/1995 | Verrier et al. |
| 5,637,839 A | 6/1997 | Yamaguchi et al. |
| 5,717,168 A | 2/1998 | DeBuisser et al. |
| 5,793,360 A | 8/1998 | Fleck et al. |
| 5,866,856 A | 2/1999 | Holtzman |
| 6,124,847 A | 9/2000 | Chery et al. |
| 6,177,927 B1 | 1/2001 | Chery et al. |
| 6,232,962 B1 | 5/2001 | Davis et al. |
| 6,266,051 B1 | 7/2001 | Holtzman |
| 6,292,177 B1 | 9/2001 | Holtzman et al. |
| 6,292,180 B1 * | 9/2001 | Lee ............................ 345/177 |
| 6,517,266 B2 * | 2/2003 | Saund ......................... 400/88 |

* cited by examiner

Primary Examiner—Vijay Shankar
(74) Attorney, Agent, or Firm—Dov Rosenfeld; Inventek

(57) ABSTRACT

An apparatus including a writing surface, such as a whiteboard, is configured to accept various elements of an electronic transcription system. In one embodiment of the invention, a writing surface, such as a whiteboard or other writing surface, includes an aperture adapted to accept a transducer of the transcription system.

21 Claims, 6 Drawing Sheets

METHODS AND APPARATUS FOR CONFIGURING A WRITING SURFACE

FIELD OF THE INVENTION

The invention relates to electronic transcription systems. More particularly, the invention relates to electronic transcription systems for preconfigured and/or reconfigurable writing surfaces.

BACKGROUND OF THE INVENTION

Electronic blackboards date at least to the mid-1960s, when emphasis was placed on the communication of graphical data, specifically handwriting and sketches, from one location to another. Fisher et al. U.S. Pat. No. 3,706,850 discloses a system related to such activity.

At about the same time, graphic tablets that allowed the entry of line drawings into a computer were developed. Whetstone et al. U.S. Pat. No. 3,838,212 is an early example of developments in this area.

By the mid-1980s, a third kind of a product group was developed to address the need for a local hard copy of material written and sketched onto a dry-erase, so-called whiteboard. This generic group of systems, known collectively as electronic copy boards, relates fundamentally to stand-alone devices that have much in common with well known reducing photocopiers.

Each of these previously known devices attempts to provide the user with a communication medium that uses familiar writing tools. In the case of electronic blackboards and electronic copy boards, the medium is a fixed wall-mounted surface meant for mass viewing, in which marking or writing is accomplished by the use of colored markers, and in which erasing is accomplished by wiping the surface with an eraser. In the case of the graphic tablet, the medium is a desktop slate and stylus meant for individual use.

Those skilled in the art recognize that both electronic blackboards and electronic copy boards typically require dedicated, highly specialized surfaces and equipment structures. These specialized structures result in an immobile, cumbersome, and relatively expensive systems. Systems and approaches generally in this line of technical art are illustrated, for example, in Cecreman U.S. Pat. No. 3,613,066 ("Cecreman"), Garwin et al. U.S. Pat. No. 4,558,313 ("Garwin"), Hansen U.S. Pat. No. 4,506,354 ("Hansen"), Enokido U.S. Pat. No. 4,670,751 ("Enokido"), Miyamori U.S. Pat. No. 4,711,977 (Re. No. 33,936) ("Miyamori"), Mallicoat U.S. Pat. No. 4,777,329 ("Mallicoat '329"), Stefik et al. U.S. Pat. No. 4,814,552 ("Stefik"), Mallicoat U.S. Pat. No. 5,248,856 ("Mallicoat '856"), Murakami U.S. Pat. No. 5,023,408 ("Murakami"), and Wilson U.S. Pat. No. 5,434,370 ("Wilson").

Cecreman discloses a display panel and means responsive to the positions and moves of a pointer on the panel to generate information signals for a computer. Thin, coherent light beams parallel to the surface of the panel are systematically and repetitively displaced in crossing relation to scan at least part of the surface. The position of a marker relative to the display panel is detected by interference of the marker with the scanned light beams.

Garwin focuses on an indicator-to-data processing interface which employs a light source and a background reflector as constituents in a system to monitor occlusion of light occurring from the positioning and movement of a manually moved indicator over a surface.

Enokido discloses an eraser for an electronic blackboard having a variable erasing area. The eraser includes a small area erasing unit and a detachable large area erasing unit. Detectors determine when the eraser contacts the board surface, and whether the small area erasing unit or the large area erasing unit are currently in use.

Miyamori discloses an electronic blackboard, writing instrument, and position-detecting control unit. The system uses magnetic bias to detect the position of a writing/erasing element relative to that of video information displayed on a writing surface.

Mallicoat '329 and Mallicoat '856 address graphic input systems that employ ultrasound ("Mallicoat '329") or scanned light ("Mallicoat '856") to monitor the position of a mobile element over a surface. Mallicoat '856 includes at least two spaced transceiver-structure stations that optically track the position and motion of a writer or eraser based upon bar code techniques. While Mallicoat '856 suggests that these transceiver-structure stations may be retrofitted to a conventional writing-surface structure, no discussion is provided for performing such retrofit. Further, it is unclear whether the scanning technology disclosed in Mallicoat '856 would be suitable for a retrofit application.

Stefik discloses an input device, or stylus, for entering hand drawn forms into a computer. In particular, Stefik describes a writing instrument, a pressure switch for determining whether the instrument contacts the writing surface, an acoustic transmitter for triangulating the position of the stylus on the surface, and a wireless transmitter for transmitting data and timing information to the computer. In operation, the stylus transmits an infrared signal and an ultrasound pulse. The system receives the infrared signal essentially immediately. Two microphones receive the ultrasound pulse after a delay that is a function of the speed of sound and the distance of the stylus from each microphone. Based on the received pulses, the system calculates the stylus position. Switches for indicating functions are mounted on the stylus. Multiple styluses can be used, each transmitting a distinctive identification code so that the system can determine which stylus is the signal source.

Murakami describes an electronic blackboard, including a sensing tablet which senses the position of a writing tool that includes a tuned circuit having a predetermined resonant frequency.

Wilson discloses a graphic data acquisition system in which a digitized record is produced according to the X, Y, and Z position of a writing implement relative to a writing surface. An expanse of electromagnetic radiation is generated in a zone adjacent to the writing surface, and an electromagnetic interactive pen interacts with such electromagnetic radiation to produce a signal that locates the pen relative to the writing surface.

Previously known apparatus also provide transcription systems that may be removably attached to a writing surface, such as a whiteboard. For example, Holtzman U.S. Pat. No.

6,266,051 ("Holtzman") describes retrofittable apparatus for converting a substantially planar surface into an electronic data capture device, in which the components of the system are readily retrofittable to a wide variety of otherwise conventional writing-surface structures, such as whiteboards. Conventional triangulation techniques are used to track the position and motion of a writer or eraser. An encoding facility associated with the writing implement provides the ability to distinguish whether the writing implement is used for marking or erasing, and also may determine the nature or character of written line width or eraser swath. A data stream thus generated can be used in a variety of ways, such as for example, to feed information into the memory of a digital computer, and/or to feed information for transmission to remote stations.

Although the Holtzman system provides a useful solution to the problem of retrofitting an electronic data capture function to a writing surface, it is also desirable to provide a more permanent installation to a writing surface, such as a whiteboard, after manufacture and/or sale/use thereof, and thereby avoid such concerns as positioning, and calibration. It also would be desirable to provide an inexpensive system.

It further would be advantageous to provide electronic transcription systems that adapt a writing surface, such as standard whiteboard, for use with an electronic transcription system and also avoid the use of temporary fasteners and other such expedients.

SUMMARY OF THE INVENTION

The invention includes electronic transcription systems that may be used with pre-configured or reconfigured writing surfaces, such as whiteboards or other writing surfaces, to provide an electronic transcription system. As used herein, the term pre-configure means a writing surface that is partially prepared for the electronic transcription system during manufacture or before sale thereof, and the term reconfigured refers to a writing surface that is prepared for the electronic transcription system after manufacture or sale thereof.

In one embodiment of the invention, a kit is provided to incorporate an electronic transcription system into a prepared whiteboard. In another embodiment of this invention a writing surface, such as a whiteboard or other writing surface, is provided through which apertures are formed to accept receivers and/or transmitters used by the electronic transcription system.

DETAILED DESCRIPTION OF THE INVENTION

The invention provides methods and apparatus and for fitting an electronic transcription system to a writing surface such as a whiteboard or other suitable writing surface. Persons of ordinary skill in the art will appreciate that a writing surface may include a whiteboard, blackboard, easel, wall, monitor, e.g., a flat screen or CRT monitor, projection screen, tabletop, writing tablet, and any other surface upon which a user may make marks or position a stylus. Further, for purposes of the discussion herein, an electronic transcription system means any system by which a user may use a stylus to capture marks and/or issue commands by positioning the stylus relative to the writing surface. Examples of systems that can be adapted for use with the invention herein are provided above. Those skilled in the art will appreciate that other systems may also be adapted for use with the invention described herein.

Figure 1:
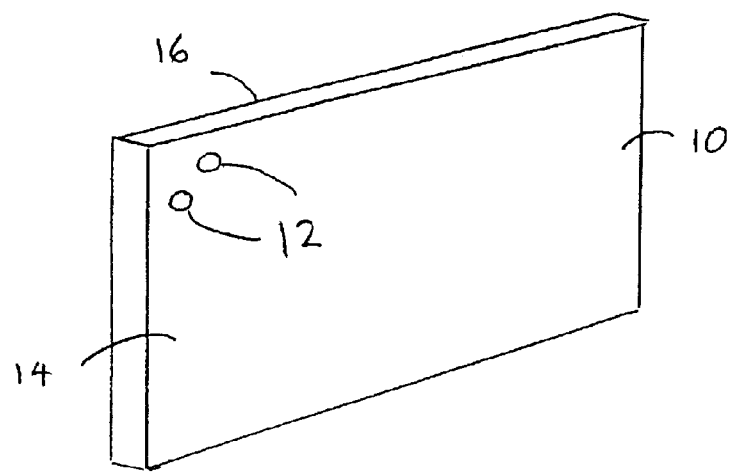
FIG. 1 is a perspective view of an exemplary embodiment of writing surfaces in accordance with this invention.

Referring to FIG. 1, an exemplary embodiment of the invention includes a writing surface 10, such as a whiteboard of the type commonly found in office environments. One or more apertures 12 extend between a front surface 14 and a back surface 16 of writing surface 10, and are sized to receive transducers of an electronic transcription system, such as transducers described in Holtzman U.S. Pat. No. 6,266,051. Person of ordinary skill in the art understand that any other electronic transcription system may be used in connection with this invention. Also, apertures 12 need not penetrate writing surface 10 entirely from front to back, and need not be formed normal to the plane of writing surface 10. Indeed, apertures 12 may be pre-punched or perforated segments of writing surface 10 for ready removal, and may be keyed to locate the transducers within apertures 12 in a predetermined orientation.

Figure 2:
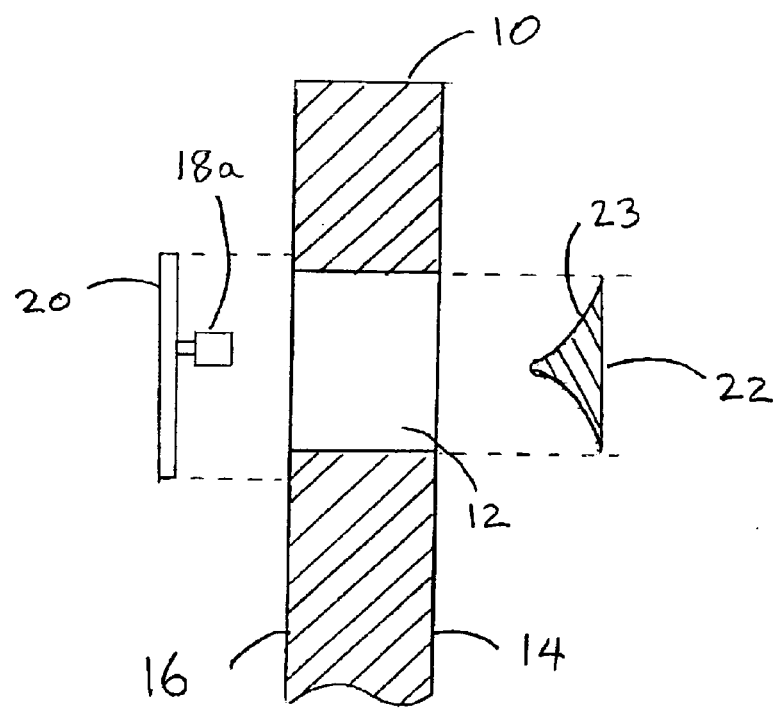
FIG. 2 is a partial cross-sectional view of the writing surface of FIG. 1 and an electronic transcription system mounted thereto in accordance with an exemplary embodiment of this invention.

As shown in FIG. 2, electronic transcription systems for use with this invention include transducers 18 that may be mounted to circuit assembly 20, such as a printed circuit board. Transducers 18 may be ultrasound transducers. Circuit assembly 20 may include transcription system electronics, or may only include driving and/or interface circuitry for the transducers. Circuit assembly 20 supports transducers 18 and positions the transducers to protrude through apertures 12 and extend partially to, at, or beyond front surface 14 of writing surface 10.

In accordance with this invention, apertures 12 may be covered by a cover or plug or other such mechanism (not shown) until a user desires to install a transcription system therein. Alternatively, apertures 12 may be perforated or partially formed and readily punched out when installation of the transcription system is desired. In other embodiments of the invention, writing surface 10 may include transducers 18 preinstalled, i.e., a preconfigured system. In such embodiments of the invention, the incorporation of the transducers into the writing surface itself provides a low profile and reliable mechanism for delivering an electronic transcription system.

In another embodiment of the invention, a kit may be provided that allows a user to adapt a standard whiteboard or other such writing surface for use with an electronic transcription system of the type described herein. In such an embodiment, a drilling template, and optionally a drill bit of an appropriate diameter, may be provided that includes indicia that may be used to form apertures 12 by drilling holes in the writing surface. The template helps assure that the holes are properly positioned relative to each other and relative to the writing surface and edges of the writing surface. The template may be made of any material, such as paper, plastic, or fiberboard, and it may include a weak adhesive on a back surface thereof to hold it to the writing surface during drilling of the apertures.

Figure 4:
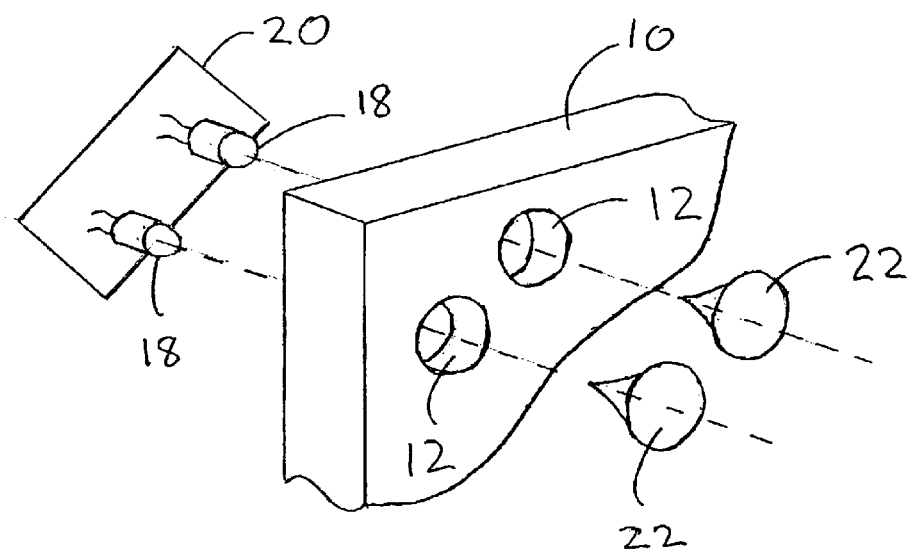
FIG. 4 is a perspective view of the writing surface of FIG. 1 showing an exemplary embodiment of an electronic transcription system according to this invention.

FIGS. 2 and 4 show partial cross-sectional views of exemplary embodiments of this invention, in which, ultrasound transducer 18 is mounted to circuit assembly 20. In addition, sound focusing element 22 may be positioned at or near front surface 14 of writing surface 10. Sound focusing element 22 has a surface 23 having a conical, curved, or parabolic shape, such that ultrasound waves emitted from a stylus reflect from surface 23 and are directed to aperture 12 and ultrasound transducer 18. An example of such a system is described in Zloter et al. U.S. Pat. No. 6,300,580, which is incorporated by reference herein in its entirety.

Figure 3:
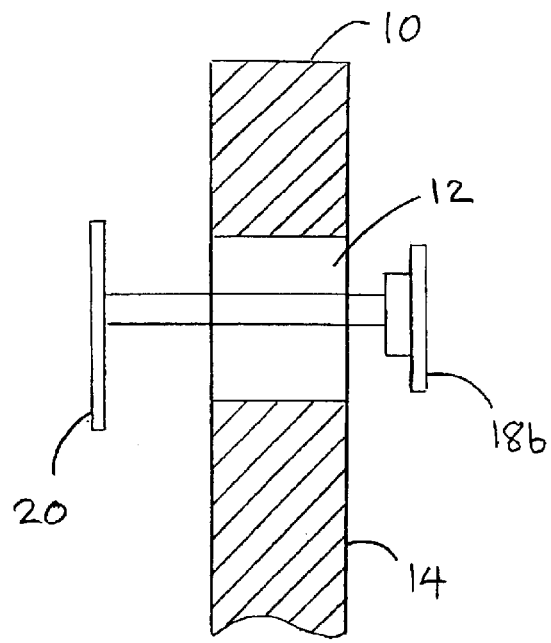
FIG. 3 is a cross section of the writing surface of FIG. 1 and an electronic transcription system mounted thereto in accordance with another exemplary embodiment of this invention.

FIG. 3 shows a cross-section of another exemplary embodiment of the invention, in which a piezoelectric film transducer 18*b* may be positioned on front surface 14 of writing surface 10. In this embodiment, a sound focusing element is unnecessary because transducer 18*b* may be positioned at front surface 14. Although not shown in FIG. 3, transducers 18 may be spring-loaded and include a ratchet mechanism, such that the transducers protrude from front surface 14 when electronic transcription is desired to be used, and may be retracted when use of the electronic transcription system is not desired. In addition, a compressive spring retaining mechanism (not shown) also may be included to pull a retaining portion of transducers 18 into compressive abutment with front surface 14 and pull a retaining portion of electronics assembly 20 into compressive abutment with back surface 16.

Figure 5:
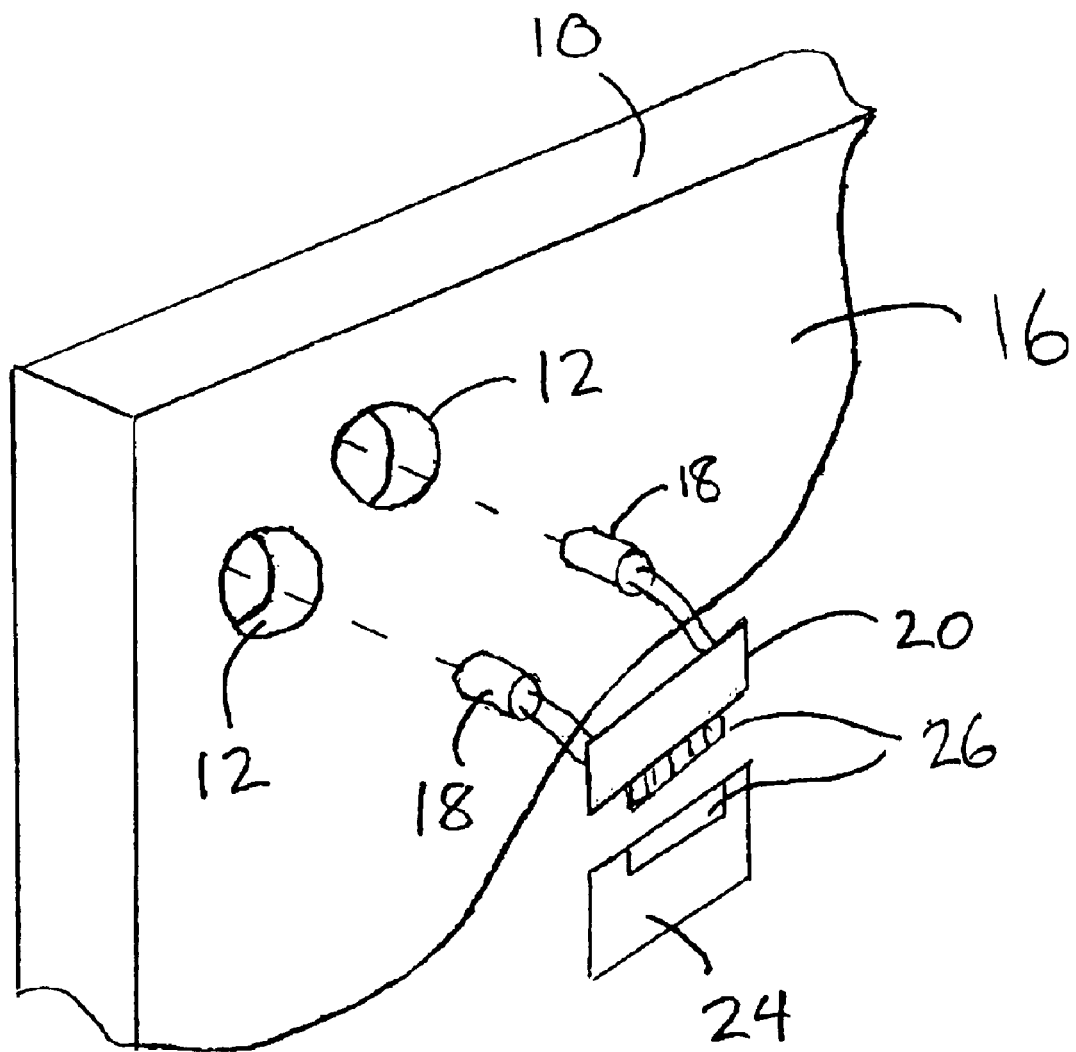
FIG. 5 is a perspective view of a back portion of a writing surface and another exemplary embodiment of this invention.

FIG. 5 shows a back view of other exemplary embodiments of electronic transcription systems according to the invention. In these embodiments, writing surface 10 may include some or all circuitry 18, 20 and 24 that together form an electronic transcription system. For example, writing surface 10 may include electronic components 24 that include inexpensive circuitry used in an electronic transcription system. Mating connectors 26 may be provided that allow a user to install transducers 18 and/or electronics assembly 20, for example, upon purchase of a transcription system option. Alternatively, writing surface 10 may include transducers 18 and/or electronics assembly 20. A user may then be able to install electronic components 24, for example, upon purchase of an alternative transcription system option. Such systems are convenient with regard to purchasers who wish to configure writing system 10 as an electronic transcription system after the writing system is initially purchased. In such cases, it is only necessary to purchase or add transducers 18, electronics assembly 20, or electronic components 24, as necessary, to the system when desired. In other embodiments of the invention, transducers 18 electronics assembly 20 and electronic components 24 may be included with writing surface 10, but may be inoperative until a user purchases a software or hardware key or other suitable device (not shown) to activate or enable the electronic transcription system.

Figure 6A:
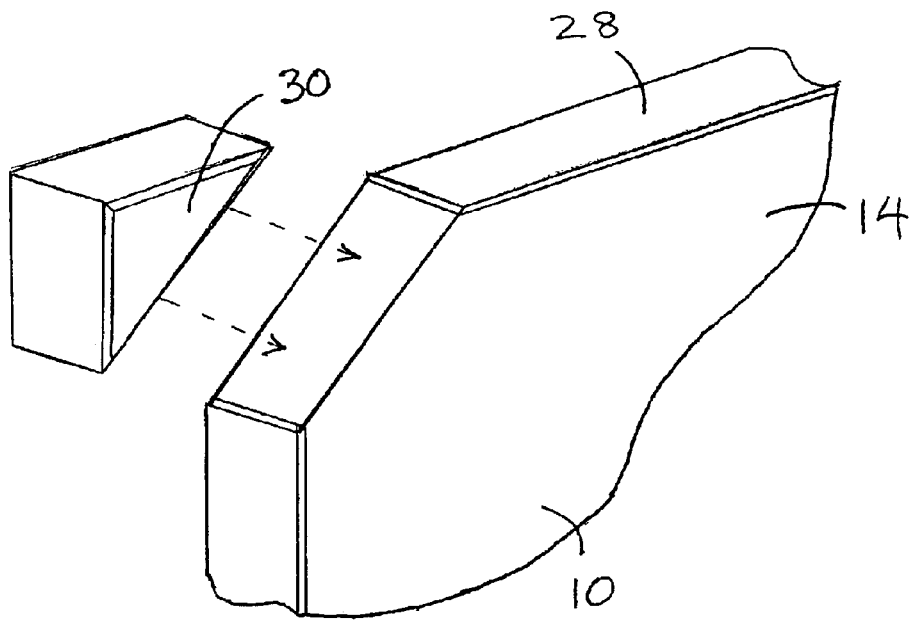
FIG. 6A is a perspective view of another embodiment of the invention showing a removable portion an edge of a writing surface.
Figure 6B:
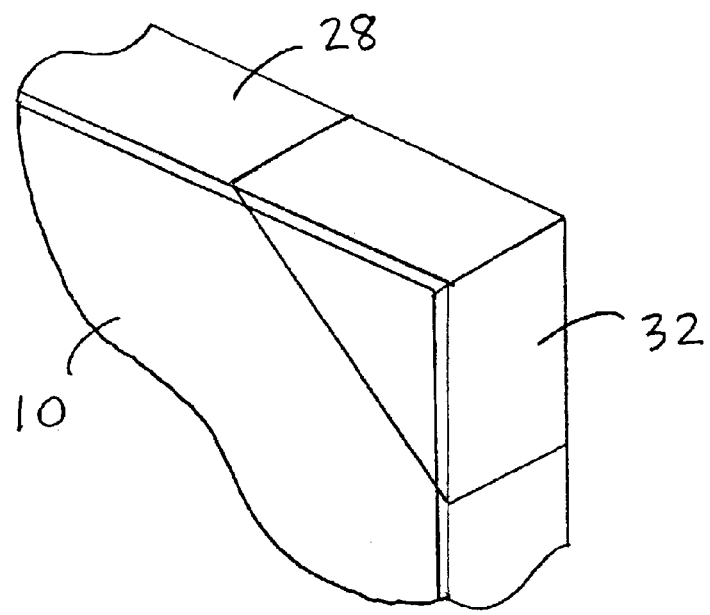
FIG. 6B is a perspective view of the writing surface of FIG. 6A with an electronic transcription system incorporated into an edge of the writing surface.

Referring now to FIG. 6, another exemplary embodiment of this invention is shown in which a transcription system is incorporated into frame 28 of writing surface 10. Writing surface 10 may include a dummy portion, such as a corner or other portion 30 that may be removed (FIG. 6A) and replaced with active portion 32 of a similar shape (FIG. 6B) that incorporates components of the transcription system, such as an ultrasound transducer. It will be appreciated by those skilled in the art that the portion to be replaced need not be a corner portion, but may be a side portion, a top portion, a bottom portion, or any other portion of frame 28, or it may be a portion of writing surface 10 itself. Further, writing surface 10 may be pre-wired with one or more electronic connectors (not shown) such that when portion 30 of the whiteboard is removed, active portion 32 is incorporated into the writing surface without the need for exposed wires or other connections.

Figure 7:
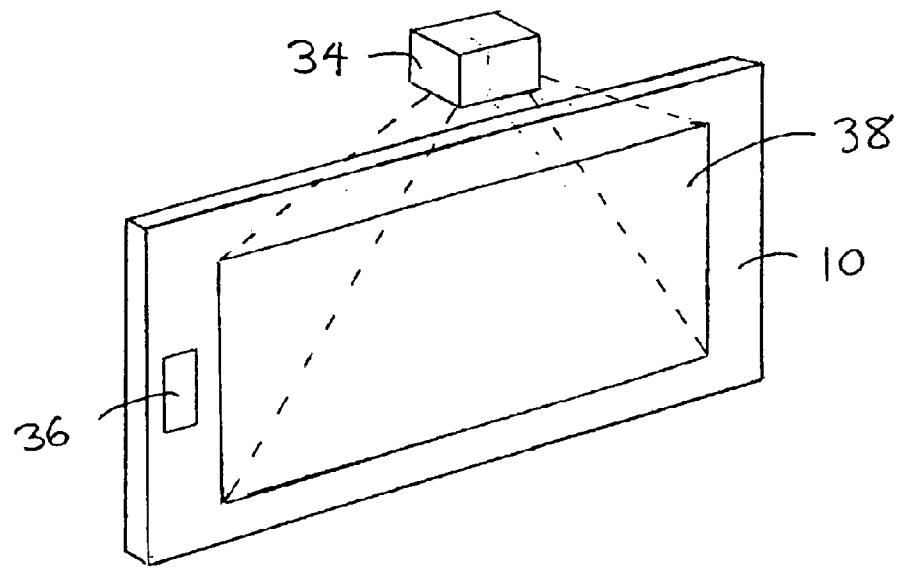
FIG. 7 is perspective view of an embodiment of the invention which shows a transcription system that may be used in connection with a retrofittable or embedded system.

Referring now to FIG. 7, another exemplary embodiment of the invention is described, which includes projection element 34 and transcription system 36. This system may be provided in connection with writing surface 10, which may be configured to provide a projection surface, or a projection screen. Projection element 34 may be any conventional projection element, such as a liquid crystal display projector, digital light processing projector, or any other suitable projector, and may be positioned to form an image 38 on writing surface 10, where image 38 is formed in a manner as is known in the art. Writing surface 10 also may be a transparent medium that allows projection element 34 to make use of known rear projection techniques.

Figure 8:
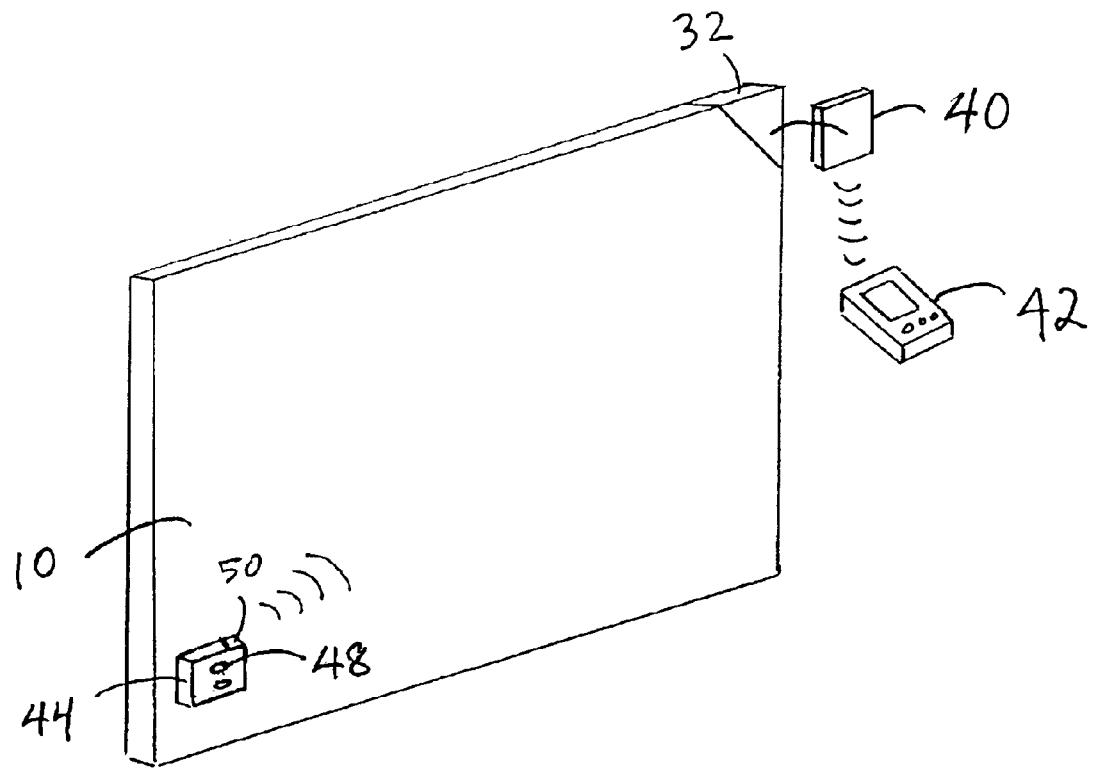
FIG. 8 is a perspective view of an electronic transcription system according to the invention in which a wireless interface is provided.

FIG. 8 illustrates another embodiment of the invention in which a wireless module may be used to communicate data produced by, or for use by, the transcription system with one or more remote devices. Wireless device 40 may be coupled to writing surface 10 via, e.g., transcription system 32, and may include an infrared (IR) transmitter that is adapted to send information to IR receiving device 42, such as a Palm Pilot, personal organizer, personal digital assistant, cellular telephone, personal handheld computer, laptop computer, or other suitable device. IR device 40 may be bi-directional such that the operation of transcription system 32 may be controlled by the device 42. Persons of ordinary skill in the art will understand that wireless communication may be accomplished by any known mechanism, for example IR, radio frequency (RF), microwaves, lasers, or any other suitable method. The communications protocol between transcription system 32 and device 40 may be via the Bluetooth or 802.11 protocols. Those skilled in the art will appreciate that any other protocols may be used for such communication.

Also shown in FIG. 8 is optional wireless function module 44 that may include one or more input devices 48 for inputting function commands to transcription system 32. Module 44 may be placed on or near writing surface 10, and may be used to communicate desired function commands, such as "print screen," "next page," "save," "erase," or any other suitable command to transcription system 32. Input devices 48 may be push-button switches, touch-sensitive elements, or any other suitable devices for indicating a user-activated command. When a user presses input device 48, circuitry (not shown) inside module 44 causes infrared transmitter 50 to transmit an infrared signal having identifiable characteristics (e.g., signal amplitude, frequency, pulse repetition frequency, etc.) that may be detected by infrared receivers in transcription system 32. Transcription system 32 may then decode the received infrared signals and execute the desired command.

Figure 9:
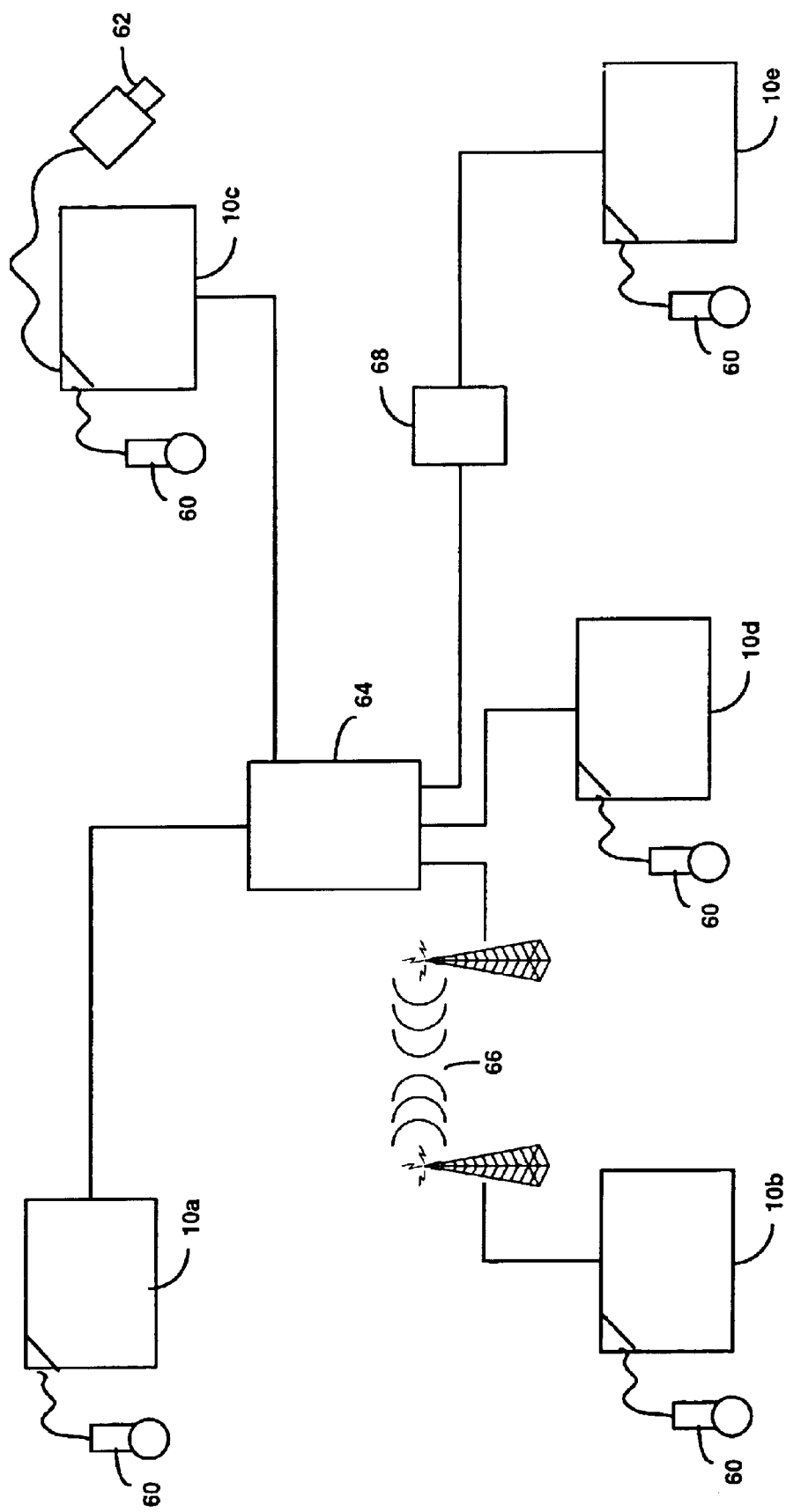
FIG. 9 is a block schematic diagram of an electronic transcription system according to the invention which incorporates a transcription session server according to the invention.

FIG. 9 shows another embodiment of this invention in which operation of several writing surfaces 10*a*–10*e* may be coordinated from a central location, for example, by a server 64 in an office building or campus having several conference rooms or other whiteboard locations. Systems in accordance with this invention may include voice 60 and video 62 capabilities, and may be connected to server 64 via a wireless network 66 or other network connections 68 as are known in the art. Such systems may also include video conferencing capabilities. Further, server 64 may effect intercommunication between the various whiteboard and conferencing facilities to allow multi-party, interactive sessions. Writing surfaces 10*a*–10*e* also may include an external hub which provides such connection as network connections, iRDA connections, and PCMCIA connections; or may include an internal hub which may include any of the foregoing connections. Such hubs may also include any other connections, for example 10 baseT/100 baseT Ethernet connections, video, e.g., VGA, connections, scanning device connections, e.g., CCDs, printer connections, and others as desired.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow. For example, the invention may incorporate such elements as a printer, scanner, projector, camera, or microphone, all within a preconfigured/reconfigurable form factor, e.g., the invention may provide openings and/or connections within a writing surface for attaching or otherwise incorporating such devices, or may include locations within the writing surface for positioning such devices.

What is claimed is:

1. A method for configuring a writing surface for use with an electronic transcription system comprising a transducer, the method comprising:

forming an aperture from a front surface to a back surface of the writing surface at a pre-determined location along the surface, the aperture adapted to receive the transducer, such that the writing surface is partially prepared for the electronic transcription system during manufacture or before sale of the writing surface, or prepared for the electronic transcription system after manufacture or sale of the writing surface.

2. The method of claim 1, wherein the method further comprises providing a template comprising indicia that may be used to form the aperture.

3. The method of claim 1, wherein the forming step comprises pre-punching a segment of the writing surface.

4. The method of claim 1, wherein the forming step comprises perforating a segment of the writing surface.

5. The method of claim 1, further comprising providing a cover adapted for removable attachment to the aperture.

6. The method of claim 1, further comprising providing a plug adapted for removable attachment to the aperture.

7. An apparatus comprising:

a writing surface having an aperture formed between a front surface and a back surface of the writing surface at a pre-determined location at the surface; and an electronic transcription system comprising a transducer adapted for fitting within the aperture, such that the writing surface is partially prepared for the electronic transcription system during manufacture or before sale of the writing surface, or prepared for the electronic transcription system after manufacture or sale of the writing surface.

8. The apparatus of claim 7, wherein the electronic transcription system further comprises an electronic assembly coupled to the transducer.

9. The apparatus of claim 8, wherein the electronic assembly is coupled to the back surface and positions the transducer through the aperture.

10. The apparatus of claim 7, wherein the transducer comprises an ultrasound transducer.

11. The apparatus of claim 7, wherein the writing surface further comprises a cover adapted for removable attachment to the aperture.

12. The apparatus of claim 7, wherein the writing surface further comprises a plug adapted for removable attachment to the aperture.

13. The apparatus of claim 7, wherein the aperture comprises a pre-punched segment of the writing surface.

14. The apparatus of claim 7, wherein the aperture comprises a perforated segment of the writing surface.

15. The apparatus of claim 7, further comprising a signal focusing element coupled to the front surface.

16. The apparatus of claim 15, wherein the signal focusing element comprises a surface having a parabolic shape.

17. An apparatus comprising:

a writing surface having a removable first portion at a pre-determined location along the surface;

a second portion comprising an electronic transcription system, the second portion adapted to replace the removable first portion, such that the writing surface is partially prepared for the electronic transcription system during manufacture or before sale of the writing surface, or prepared for the electronic transcription system after manufacture or sale of the writing surface.

18. The apparatus of claim 17, wherein the writing surface comprises a frame, and the first portion is a portion of the frame.

19. The apparatus of claim 17, wherein the writing surface further comprises an electronic connector, and the second portion is adapted to be coupled to the electronic connector.

20. The apparatus of claim 17, wherein the electronic transcription system comprises an ultrasound transducer.

21. The apparatus of claim 17, further comprising a projector adapted to project an image on the writing surface.

* * * * *